(12) United States Patent
Payne

(10) Patent No.: US 6,555,037 B1
(45) Date of Patent: Apr. 29, 2003

(54) MULTIAXIS ROTATIONAL MOLDING METHOD AND APPARATUS

(76) Inventor: LeRoy Payne, 4336 Christensen Rd., Billing, MT (US) 59101

( * ) Notice: Subject to any disclaimer, the term of this patent is extended or adjusted under 35 U.S.C. 154(b) by 0 days.

(21) Appl. No.: 09/673,714

(22) PCT Filed: May 1, 1998

(86) PCT No.: PCT/US98/08804

§ 371 (c)(1), (2), (4) Date: Oct. 19, 2000

(87) PCT Pub. No.: WO99/56929

PCT Pub. Date: Nov. 11, 1999

Related U.S. Application Data

(60) Continuation-in-part of application No. PCT/US96/15498, filed on Sep. 26, 1996, now Pat. No. 6,296,792, which is a continuation-in-part of application No. PCT/US95/14194, filed on Nov. 3, 1995, which is a continuation-in-part of application No. PCT/US95/06301, filed on May 18, 1995, which is a continuation-in-part of application No. 08/345,564, filed on Nov. 25, 1994, now Pat. No. 5,503,780, which is a continuation-in-part of application No. 08/249,744, filed on May 26, 1994, now Pat. No. 5,507,632, which is a continuation-in-part of application No. 08/950,135, filed on Sep. 24, 1992, now Pat. No. 5,316,701, which is a division of application No. 07/707,656, filed on May 30, 1991, now Pat. No. 5,188,845, which is a continuation-in-part of application No. 07/417,502, filed on Oct. 5, 1989, now Pat. No. 5,022,838, which is a continuation-in-part of application No. 07/271,686, filed on Nov. 16, 1988, now Pat. No. 4,956,135, which is a continuation-in-part of application No. 07/202,267, filed on Jun. 6, 1988, now Pat. No. 4,956,135, which is a continuation-in-part of application No. 06/890,742, filed on Jul. 30, 1986, now Pat. No. 4,749,533, which is a division of application No. 06/766,498, filed on Aug. 19, 1985, now Pat. No. 4,671,753.

(51) Int. Cl.[7] .......................... B29C 33/02; B29C 33/36; B29C 41/06

(52) U.S. Cl. .................. 264/40.7; 264/40.1; 264/255; 264/297.2; 264/310; 264/311; 264/328.8; 264/328.11; 425/144; 425/150; 425/435; 425/576

(58) Field of Search ................. 264/40.1, 40.3, 264/40.7, 250, 255, 310, 311, 297.2, 297.3, 309, 319, 328.8, 328.11; 425/120, 143, 144, 147, 150, 435, 576

(56) References Cited

U.S. PATENT DOCUMENTS

| | | | | |
|---|---|---|---|---|
| 3,966,870 A | * | 6/1976 | Vecchiotti | 264/114 |
| 4,043,721 A | * | 8/1977 | Lemelson | 425/116 |
| 4,104,357 A | * | 8/1978 | Blair | 264/255 |
| 4,146,565 A | * | 3/1979 | Quraishi | 264/219 |
| 4,285,903 A | * | 8/1981 | Lemelson | 264/255 |

(List continued on next page.)

Primary Examiner—Angela Ortiz
(74) Attorney, Agent, or Firm—Arthur L. Urban

(57) ABSTRACT

A method of continuously forming integrally molded structures includes the steps of rotating a plurality of independently movable multisection mold assemblies about a plurality of axes, successively flowing a plurality of polymerizable mixtures over surfaces of each enclosed mold cavity while selectively heating mold sections thereof in a preselected heating profile and monitoring the flowing of each mixture, the heating of the mold sections and the formation of resins therefrom. The monitored mixture flowing, the mold section heating and the formation of each resin are coordinated with each monitored axis rotation. The molded structure is removed after it has achieved structural integrity within the mold cavity, and the steps are repeated to form a multiplicity of the integrally molded structures on a continuing basis. Also, multiaxis molding apparatus for conducting the above method.

20 Claims, 1 Drawing Sheet

U.S. PATENT DOCUMENTS

| | | | | |
|---|---|---|---|---|
| 4,457,729 A | * | 7/1984 | Peerlkamp | 114/357 |
| 4,548,779 A | * | 10/1985 | Steinberg et al. | 264/255 |
| 4,571,319 A | * | 2/1986 | Baluch et al. | 264/255 |
| 4,956,133 A | * | 9/1990 | Payne | 264/297.8 |
| 4,956,135 A | * | 9/1990 | Payne | 264/297.1 |
| 5,011,636 A | * | 4/1991 | Payne | 264/311 |
| 5,022,838 A | * | 6/1991 | Payne | 156/425 |
| 5,188,845 A | * | 2/1993 | Payne | 264/310 |
| 5,316,701 A | * | 5/1994 | Payne | 264/1.24 |
| 5,503,780 A | * | 4/1996 | Payne | 264/1.24 |
| 5,507,632 A | * | 4/1996 | Payne | 264/310 |
| 5,705,200 A | * | 1/1998 | Payne | 264/2.1 |
| 6,030,557 A | * | 2/2000 | Payne | 264/310 |
| 6,296,792 B1 | * | 10/2001 | Payne | 264/310 |

* cited by examiner

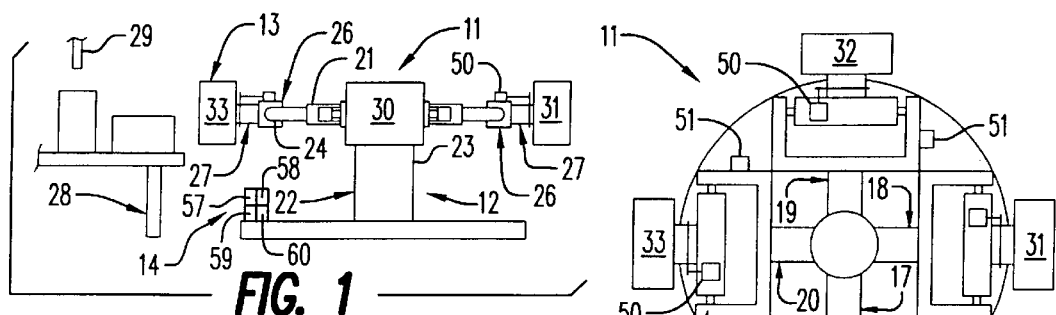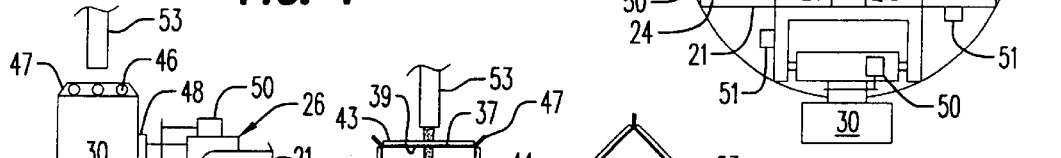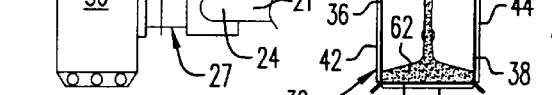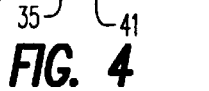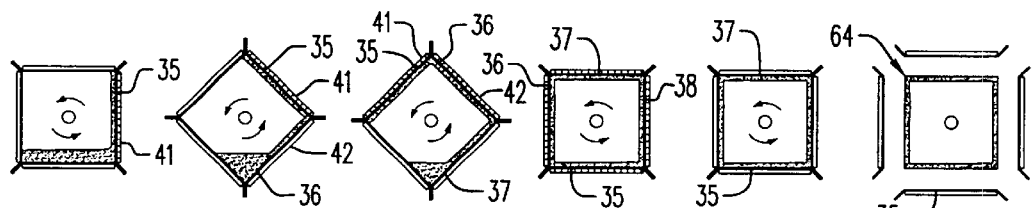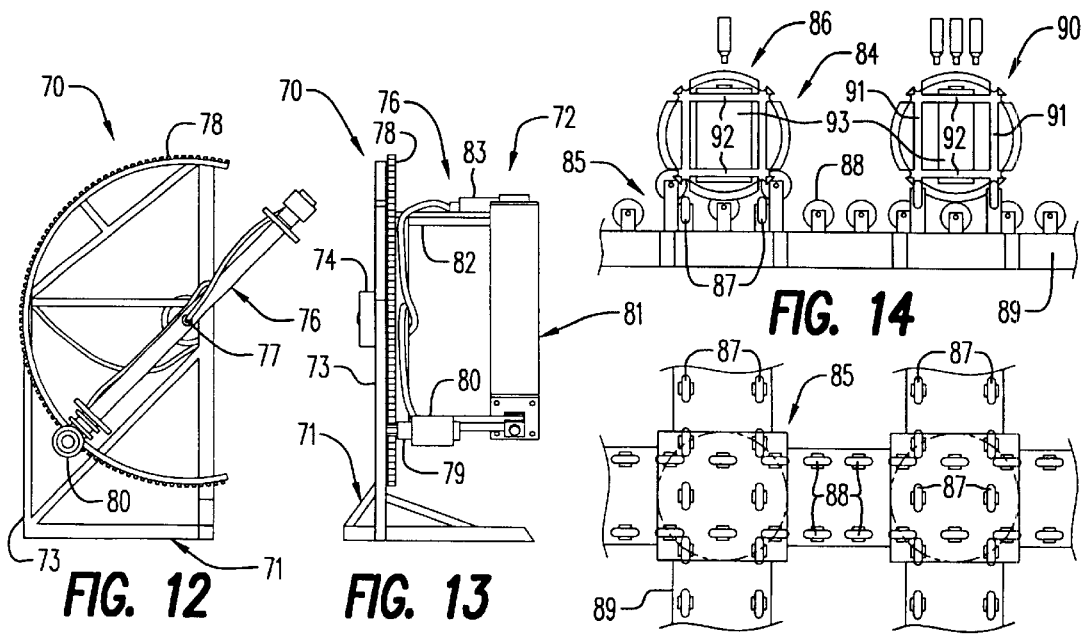

MULTIAXIS ROTATIONAL MOLDING METHOD AND APPARATUS

This application is a continuation-in-part of application No. PCT/US96/15498, filed Sep. 26, 1996, now U.S. Pat. No. 6,296,792 which in turn is a continuation-in-part of pending application No. PCT/US95/14194, filed Nov. 3, 1995, which in turn is a continuation-in-part of pending application No. PCT/US95/06301, filed May 18, 1995, which in turn is a continuation-in-part of application Ser. No. 08/345,564, filed Nov. 25, 1994, now U.S. Pat. No. 5,503,780, which in turn is a continuation-in-part of application Ser. No. 08/249,744, filed May 26, 1994, now U.S. Pat. No. 5,507,632, which in turn is a continuation-in-part of application Ser. No. 08/950,135, filed Sep. 24, 1992, now U.S. Pat. No. 5,316,701, which in turn is a division of application Ser. No. 07/707,656, filed, May 30, 1991, now U.S. Pat. No. 5,188,845, which in turn is a continuation-in-part of application Ser. No. 07/417,502, filed Oct. 5, 1989, now U.S. Pat. No. 5,022,838, which in turn is a continuation-in-part of application Ser. No. 07/271,686, filed Nov. 16, 1988, now U.S. Pat. No. 4,956,133, which in turn is a continuation-in-part of application Ser. No. 07/202,267, filed Jun. 6, 1988, now U.S. Pat. No. 4,956,135, which in turn is a continuation-in-part of application Ser. No. 06/890,742, filed Jul. 30, 1986, now U.S. Pat. No. 4,749,533, which in turn is a division of application Ser. No. 06/766,498, filed Aug. 19, 1985, now U.S. Pat. No. 4,671,753.

This invention relates to a novel molding method and apparatus and more particularly relates to a new multiaxis rotational molding method and apparatus.

The production of man-made plastic and resin articles is an industry that utilizes a high degree of automatically controlled continuous processing. However, for units of appreciable size, batch processing still is the rule rather than the exception. For example, in the production of fiberglass structures such as boats, it is customary to construct the hulls by hand. A plurality of resin and fiberglass layers are sequentially laminated on an open mold or a plurality of mixed resin/chopped fiber coatings are applied over the mold.

Such hand building procedures require a great amount of labor, supervision and continuous inspection to insure that a reasonable level of quality is achieved. This greatly increases the cost of the product.

The applicant's earlier patents listed above provide a novel method and apparatus for producing both large and small molded structures continuously. The apparatus includes unique combinations of components to produce a wide variety of different products. Achieving this capability requires a major capital investment. Also, personnel to utilize the broad parameters of the apparatus normally are highly trained and experienced.

The present invention provides a novel molding method and apparatus which not only overcome the deficiencies of present technology but also provide features and advantages not found in earlier expedients. The multiaxis rotational molding method and apparatus of the invention provide a means for the production of a large number of uniform high quality products rapidly and efficiently.

The multiaxis rotational molding apparatus of the present invention is simple in design and can be produced relatively inexpensively. Commercially available materials and components can be utilized in the manufacture of the apparatus. Conventional metal fabricating procedures can be employed by semi-skilled labor in the manufacture of the apparatus. The apparatus is durable in construction and has a long useful life with a minimum of maintenance.

The apparatus of the invention can be operated by individuals with limited mechanical skills and experience. A large number of high quality molded structures can be produced rapidly by such persons safely and efficiently with a minimum of supervision.

The molding method and apparatus of the invention can be modified to mold a wide variety of new structures. Variations both in product configuration and composition can be attained simply and conveniently with the method and apparatus of the invention. Even with such variations, uniformity and quality of product dimensions and shapes still are maintained without difficulty.

A novel method of the present invention for continuously forming integrally molded structures includes the steps of rotating a plurality of independently movable multisection mold assemblies about a plurality of axes. A first freshly formed polymerizable mixture is supplied to a first mold assembly. The first polymerizable mixture is flowed over surfaces of a first enclosed mold cavity within the first mold assembly while selectively heating at least one of the mold sections of the first mold assembly in a preselected heating profile. The flowing of the first mixture over the first mold cavity surfaces, the heating of the mold section and the formation of a first resin therefrom are monitored.

The first polymerizable mixture is supplied to a second mold assembly. The first polymerizable mixture is flowed over surfaces of a second enclosed mold cavity within the second mold assembly while selectively heating at least one of the mold sections of the second mold assembly in a preselected heating profile. Simultaneously therewith, a freshly formed second polymerizable mixture is supplied to the first mold assembly. The second polymerizable mixture is flowed over the first resin within the first mold cavity while selectively heating at least one of the mold sections of the first mold assembly in a preselected heating profile. The flowing of the first and second polymerizable mixtures within the first and second mold cavities, the heating of the mold sections and the formation of first and second resins therefrom are monitored.

The first polymerizable mixture is supplied to a third mold assembly. The first polymerizable mixture is flowed over surfaces of a third enclosed mold cavity within the third mold assembly while selectively heating at least one of the mold sections of the third mold assembly in a preselected heating profile. Simultaneously therewith, the second polymerizable mixture is supplied to the second mold assembly. The second polymerizable mixture is flowed over the first resin within the second mold assembly while selectively heating at least one of the mold sections of the second mold assembly in a preselected heating profile. The flowing of the first and second polymerizable mixtures within the second and third mold cavities, the heating of the mold sections and the formation of first and second resins therefrom are monitored.

The supplying of the first and second polymerizable mixtures succeeding mold assemblies and the flowing of the mixtures into the respective mold cavities while selectively heating the mold sections is continued until all of the mold assemblies have received the mixtures. Also the monitoring of the flowing of the mixtures, the heating of the mold sections and the formation of resins therefrom are continued.

The rotation of the mold assemblies is continued throughout the steps of the continuous molding operation while monitoring individually each axis rotation of the mold assemblies. The monitored flowing of each mixture, the monitored heating of the mold sections and the monitored formation of each resin are coordinated with each monitored axis rotation in a preselected profile to form the integrally molded structures of the first and second resins.

The mold sections of each mold assembly are separated after the integrally molded structure therein has achieved structural integrity within the mold cavity. The structure is removed from the separated mold sections and the steps are repeated to form a multiplicity of the integrally molded structures on a continuing basis. Advantageously, the integrally molded structures are separated from the mold assembly by cooling the molded sections.

The method of the invention preferably includes the steps of flowing at least one of the polymerizable mixtures into a mold cavity and rotating the cavity only a sufficient amount to coat the first mold section before heating the coated mold section to set the coating in place. Thereafter, the rotation of the mold cavity is continued to coat an adjacent second mold section followed by the heating of the second coated section to set the coating adhering thereto. Further rotation coats each succeeding mold section and the heating thereof results in the formation of an integrally molded product within the mold cavity. Subsequent cooling of the mold sections frees the molded structure from the mold assembly.

Advantageously, the mold assembly is transferred to an adjacent mold receiving station prior to separating the mold sections and removing the molded structure. Thereafter, the mold assembly is returned to a molding position for repeating the method of the invention. A plurality of mold assemblies may be provided for each molding position so molding can continue while other mold assemblies are being opened and being prepared for another molding cycle.

If desired, solid particles may be introduced into the mold cavity of each mold assembly and the particles distributed in a preselected configuration before supplying the first polymerizable mixture to the respective mold assembly. Also, micro spheres may be introduced into at least one of the polymerizable mixtures prior to molding.

Benefits and advantages of the novel multiaxis rotatable molding method and apparatus of the present invention will be apparent from the following description and the accompanying drawings in which:

FIG. 1 is a side view of one form of multiaxis rotational molding apparatus of the invention;

FIG. 2 is a fragmentary top view of the molding apparatus shown in FIG. 1;

FIG. 3 is an enlarged fragmentary side view of a molding portion of the molding apparatus shown in FIGS. 1 and 2;

FIGS. 4–11 are schematic illustrations of steps in the molding method of the present invention;

FIG. 12 is a side view of a further form of the multiaxis rotational molding apparatus of the present invention;

FIG. 13 is a side view taken from the left of the molding apparatus shown in FIG. 12;

FIG. 14 is a fragmentary side view of another form of multiaxis rotational molding apparatus of the invention; and FIG. 15 is a fragmentary top view of a rotational drive portion of the molding apparatus shown in FIG. 14.

As shown in FIGS. 1–3 of the drawings, one form of multiaxis rotational molding apparatus 11 of the present invention includes a support portion 12, a molding portion 13 and a control portion 14.

The support portion 12 of the multiaxis rotational molding apparatus 11 of the invention includes a plurality of arm members 17,18,19,20 disposed in a generally horizontal orientation. One end 21 of each arm member 17–20 extends from an upstanding frame section 22. Advantageously, the upstanding frame section 22 includes a central upstanding section 23 from which the arm members extend radially as shown in the drawings.

The molding portion 13 of the rotational molding apparatus 11 includes a plurality of mold supporting assemblies 26. One mold supporting assembly is rotatably mounted adjacent a free end 24 of each arm member 17–20. Each mold supporting assembly 26 includes an independently rotatable mold connector section 27. As shown in the drawings, the molding apparatus preferably includes mold assembly receiving stations 28 adjacent each arm member 17–20. The mold receiving stations advantageously also include mold transferring means such as hoist 29.

The molding portion 13 further includes a plurality of mold assemblies 30,31,32,33. As shown in FIGS. 4–11 each mold assembly includes a plurality of separable mold sections 35,36,37,38 forming a substantially enclosed mold cavity 39. A heating element is associated with each mold sections 35–38. For example, mold section 35 includes heating element 41; section 36, heating element 42; section 37, element 43 and section 38, element 44.

The heating elements 41–44 advantageously include thermoelectric elements. Preferably, the thermoelectric elements function in an operating temperature range providing heating and cooling as will be described hereinafter.

Connecting means e.g. electromagnets 46 located in flange sections 47 of the mold sections (FIG. 3), selectively secure the assembled mold sections together. Also, connecting means 48 secure the assembled mold assembly to mold connector section 27.

The control portion 14 of the molding apparatus 11 of the present invention includes actuating means including drive means 50,51 for each mold assembly. One drive means 50 rotates each mold supporting assembly 26 and the mold assembly 30–33 affixed thereto. Another drive means 51 rotates each mold supporting assembly 26 and the mold assembly affixed thereto along an axis generally perpendicular to the axis of rotation achieved with drive means 50. Other drive means may be provided for opening, closing, transferring mold assemblies, etc. as required.

The control portion 14 also includes programmable memory means 57, coordinating means 58, monitoring means 59 and circuitry therefor. The drive means 50,51 advantageously include gear motors, chains and sprockets connected thereto. Preferably, the gear motors are variable speed motors. The actuating means may activate other components such as pumps, valves, drives, electromagnets, etc.

The coordinating means 58 advantageously includes a process controller 60 that initiates changes in the flows of materials and speeds of drives for each mold assembly to bring variations therein back to the respective rates specified in the programs present in the memory 57. This coordination commonly is achieved through the transmission of information such as digital pulses from the monitors and/or sensors at the control components to the process controller 60.

The operating information is compared with the preselected programming parameters stored in the memory 57. If differences are detected, instructions from the controller change the operation of the components to restore the various operations to the preselected processing specifications.

In the use of the multiaxis rotational molding apparatus 11 of the present invention, the designs of the structures desired first are established. Then, each design is programmed into the memory 57.

To start the operation of the apparatus 11, buttons and/or switches of a control panel (not shown) are depressed to activate the memory 57 and the other components of the control portion 14. The coordinating means 58 energizes drive means 50,51.

Also, monitors 59 and pumps,, valves, etc. (not shown) are energized by the coordinating means 58 in the preselected sequences of the program stored in the memory 57. This causes the raw materials in reservoirs (not shown) to advance along inlet conduits toward the respective mold assemblies 30–33. For example, to mold a structure including a polyurethane resin, one reservoir may contain a liquid reactive resin forming material, a second reservoir a particulate solid recyclable material and a third or more reservoirs—colors, catalysts, etc. as required.

To produce high quality molded structures of the invention, it is important that the raw material be uniform in volume and composition. This can be facilitated by providing a continuous flow of raw materials and/or mixtures thereof onto the cavity surface of a mold assembly 30–33. However, the volume of the mixture delivered will vary depending upon the particular incremental area being covered at any instant. Also, the delivery to a particular mold assembly will be terminated completely when a molded structure is being removed from that assembly.

Advantageously, a separate bypass conduit (not shown) is utilized from the end of each inlet conduit at a point adjacent a particular mold assembly back to the respective reservoir. This construction provides for the delivery of uniform raw materials and/or freshly formed mixtures thereof even though the distance is considerable between the reservoirs and the mold assemblies. The control portion 14 coordinates the operation of the various system components so the required formulation flows onto the desired areas of a particular preselected mold cavity.

Rotation of each mold assembly 30–33 about an axis concentric with that of mold connector section 27 and rotational movement of the mold assembly about a second axis perpendicular to its concentric axis are started and continue while the raw materials and/or freshly formed polymerizable mixtures are transferred into each preselected cavity 39 of a mold assembly. The multiple axis rotational movement and any arcuate movement are continued to complete the flow of the mixture over all areas being covered within a particular mold cavity. All movements are controlled within the parameters stored in the memory 57.

For particular structures, the movements about the respective axes may be continuous and/or intermittent at changing rates. Also, it may be desirable to provide arcuate rotation, that is, movement about an arc such as a rocking motion. Monitors 59 located within each mold assembly 30–33 signal the process controller 60 when each polymerizable mixture has been distributed over the preselected areas of the respective mold cavity so the controller can initiate the next step of the molding method.

With the control components of the molding apparatus 11 activated, a first dispenser 53 is aligned with the first mold assembly 30. As schematically illustrated in FIGS. 4–11, a first freshly formed polymerizable mixture is introduced into mold cavity 39 and flows downwardly by gravity onto the cavity surface of mold section 35 disposed at the bottom of the cavity.

Thereafter, the mold assembly 30 is rotated to a position shown in FIG. 5 wherein a coating 63 is forming on the cavity from the pool of liquid 62 remaining in the mold bottom. Simultaneously with the rotation, heating element 41 of mold section 35 is energized to raise the temperature of the cavity surface and set the coating to form a resin layer thereof (FIGS. 5,6).

As the rotation of the mold assembly 30 continues a coating forms on mold section 36 emerging from the liquid pool therein (FIGS. 7,8). Heating element 42 is energized, heating mold section 36 setting the coating and forming the resin layer in place. Further rotation of the mold assembly forms resin layers over the surfaces of mold sections 37,38 with the heating and setting of each coating as shown in FIGS. 9,10.

When all of the mold sections have been coated, heated and set and the structure being molded is complete, the heating elements 41–44 are de-energized causing the mold sections to cool and contract away from the integrally molded structure 64. This allows the structure to be separated from the mold assembly so that the molding operation can be repeated. The flowing of the polymerizable mixture over the cavity surfaces, the heating of the respective mold sections and the formation of a resin structure therefrom all are monitored during the molding operation.

To form multilayer structures, the steps described above may be repeated and before the mold assembly is opened, a second freshly polymerizable mixture is introduced into the resin coated mold cavity and the steps repeated with the second mixture. The coatings formed on the cavity surfaces are set in place by heating the mold sections sequentially forming a double walled structure. With the appropriate selection of the formulation of the mixtures, the resulting molded structure, for example, may provide an integrally laminated two layer structure with a durable outer surface and a chemical resistant lining.

Continuous production of such structures can be achieved by aligning the first polymerizable mixture with an adjacent second mold assembly 31 and flowing the polymerizable mixture into the second mold cavity thereof. Simultaneously therewith, a second polymerizable mixture may be aligned with the first mold assembly 30 and the mixture delivered into the mold cavity of the first mold assembly 30 flowing over the first resin formed in the cavity. The flowing of the first and second mixtures within the first and second mold cavities, the heating and setting of the coatings and the formation of a first and second resin therefrom are monitored.

Thereafter, the first polymerizable mixture can be aligned with a third mold cavity of an adjacent third mold assembly 32 and the first mixture flowed over the cavity surfaces as described above. Simultaneously therewith, the second mixture is aligned with the second mold cavity of the second mold assembly 31 and the second mixture flowed over the first resin formed therein. The flowing of the first and second resins and formation of first and second resins therefrom are monitored.

The flowing of the first and second polymerizable mixtures into each mold cavity of any additional mold assemblies is continued until all of the mold assemblies have received the mixtures according to the preselected molding parameters. The monitoring of the mixture flow, the heating of the mold sections sequentially, the formation of resins therefrom and mold assembly rotation are continued throughout the molding operation as well as the coordinating of this operating information with the preselected program profile.

When a molded structure within a mold cavity is sufficiently cured that it possesses structural integrity, rotation of the respective mold assembly is stopped and the mold assembly is transferred to an adjacent mold receiving station 28 with hoist means 29. The mold sections 35–38 are separated by cooling them to free the structural unit.

The molded structure then may be set aside to complete the curing of the resin therein. During this period, the molded structure, free of the mold's restraint, stresses the high density outer skin or layer. This stressing of the skin increases the strength and puncture resistance thereof and also the structural strength of the unit itself.

The mold sections 35–38 are prepared for another molding cycle. This may include changing the position of one or more mold sections with respect to each other, the substitution of mold sections with different configurations and the like. Also, cavity changing inserts may be employed, if desired.

The mold sections then are assembled together and secured such as by energizing electromagnets 46. The mold assembly now is ready for repositioning on the adjacent arm member when the next mold assembly is removed therefrom.

FIGS. 12 and 13 illustrate another form of rotational molding apparatus 70 of the present invention. The apparatus provides for the molding of large structures on cantilever multi-axis molding apparatus without major reconstruction thereof.

The rotational molding apparatus 70 as shown in the drawings includes a support portion 71 and a molding portion 72. The support portion includes a vertical frame section 73 with a horizontally oriented arm member 74 extending therefrom. A U-shaped mold supporting assembly 76 is rotatably mounted on arm member 74 through a shaft 77.

A vertically disposed arcuate guide member 78 is mounted on frame section 73 in the path of one leg 79 of U-shaped mold supporting assembly 76. Drive means shown as motor 80 operatively connects the mold supporting assembly 76 with guide member 78 and advances there along to rotate the supporting assembly about shaft 77 as an axis. A mold assembly 81 is rotatably supported between the legs 79,82 of the supporting assembly 76. The mold assembly is rotated about an axis perpendicular to shaft 77 by drive means 83 mounted on leg 82.

FIGS. 14 and 15 illustrate a further form of multiaxis rotational molding apparatus of the invention. Molding apparatus 84 includes a support portion 85 and a molding portion 86. The support portion 85 includes a plurality of drive wheel assemblies 87,88 selectively movable from a base surface 89 in a preselected drive profile. The drive wheel assemblies preferably are arranged in pairs and advantageously are pivotable about an axis perpendicular to the base surface.

The support portion also may include a frame section 90 shown as a generally spherical configuration with a plurality of pairs of parallel endless tracks 91 arranged in a perpendicular orientation to other pairs of tracks 92. A mold assembly 93 is mounted within frame section 90 along a central axis thereof. The tracks 91,92 preferably are recesses engageable with the drive wheel assemblies.

Structures may be formed with the molding apparatus 84 of the invention continuously and automatically employing the control portion 14 of molding apparatus 11 described above. The control portion is programmed to selectively engage preselected drive wheel assemblies with the endless tracks 91,92 of spherical frame section 90. Rotation of the drive wheels in a preselected rotational profile rotates a mold assembly 93 supported thereby along a plurality of axes in the same way as described above with molding apparatus 11 and 70. In addition, the control portion can be programmed to transfer a mold assembly from one pair of drive wheel assemblies to an adjacent pair and onto the next pair. In this way, the programmed memory not only can distribute a polymerizable mixture over a mold cavity, but also it can transfer a mold assembly from one molding station to another.

The polymerizable mixtures employed to produce the structures of the invention are selected to be capable of reaction to form the particular resin desired in the final structure.

Advantageously, the resin is a thermosetting resin such as a polyurethane or polyester. Should a polyurethane be desired, one component may be an isocyanate and another may be a polyol. More commonly, different partially formed materials which upon mixing interact to form the desired polyurethane may be employed. Examples of such partially formed materials include so-called "A stage" resins and "B stage" resins.

Other resin forming systems may utilize a resin forming material and a catalyst. Additional components can be pre-mixed with one of the resin formers, e.g. fillers, reinforcements, colors and the like.

The particulate solid additive material may be any of a wide variety of materials which impart special properties to the final structure such as wear resistance, lubricity, electrical, magnetic, temperature conductivity or isolation, and the like. Some inexpensive particulate materials generally are readily available at a particular job site. Natural mineral particulate material such as sand and gravel normally are present or can be produced simply by crushing rock at the site.

Waste or recycled materials which can be shredded or ground into particles of suitable size can be utilized. Particularly useful are particles formed by shredding or grinding discarded tires and similar products. Since the particles are encapsulated with the resin forming material and not saturated therewith, many different waste materials may be employed.

The above description and the accompanying drawings show that the present invention provides a novel multiaxis rotational molding method and apparatus which not only overcome the deficiencies and shortcomings of earlier expedients, but in addition provide novel features and advantages not found previously. The method and apparatus of the invention provide simple inexpensive means for producing uniform high quality products efficiently and at high rates of production.

The apparatus of the invention is efficient in its design and operation and is relatively inexpensive. Commercially available materials and components can be utilized in the fabrication of the apparatus using conventional metal working techniques and procedures.

Structures can be produced automatically with the apparatus of the invention by operators with limited experience and aptitude after a short period of instruction. The apparatus is durable in construction and has a long useful life with a minimum of maintenance.

The method and apparatus of the invention can be utilized to mold a wide variety of different products. Variations in structure, configuration and composition of the products can be achieved simply and quickly with the method and apparatus of the invention.

It will be apparent that various modifications can be made in the multiaxis rotational molding method and apparatus described in detail above and shown in the drawings within the scope of the present invention. The size, configuration and arrangement of components can be changed to meet specific requirements. For example, the mold assemblies may be arranged differently with respect to one another. In addition, the number and sequence of processing steps may be different. Also, the apparatus may include other drive and actuating components and mechanisms.

These and other changes can be made in the method and apparatus described provided the functioning and operation thereof are not adversely affected. Therefore, the scope of the present invention is to be limited only by the following claims.

What is claimed is:

1. A method of continuously forming integrally molded structures in a multiaxis rotational molding operation including the steps of rotating a plurality of independently movable multisection mold assemblies about a plurality of axes, supplying a first freshly formed polymerizable mixture to a first mold assembly, flowing said first polymerizable mixture over surfaces of a first enclosed mold cavity within said first mold assembly while selectively heating at least one of said mold sections of said first mold assembly in a preselected heating profile, monitoring said flowing of said first mixture over said first mold cavity surfaces, said heating of said mold section and formation of a first resin therefrom, supplying said first freshly formed polymerizable mixture to a second mold assembly, flowing said first polymerizable mixture over surfaces of a second enclosed mold cavity within said second mold assembly while selectively heating at least one of said mold sections of said second mold assembly in a preselected heating profile, simultaneously therewith supplying a freshly formed second polymerizable mixture to said first mold assembly, flowing said second polymerizable mixture over said first resin within said first mold cavity while selectively heating at least one of said mold sections of said first mold assembly in a preselected heating profile, monitoring said flowing of said first and second polymerizable mixtures within said first and second mold cavities, said heating of said mold sections and formation of first and second resins therefrom, supplying said first polymerizable mixture to a third mold assembly, flowing said first polymerizable mixture over surfaces of a third enclosed mold cavity within said third mold assembly while selectively heating at least one of said mold sections of said third mold assembly in a preselected heating profile, simultaneously therewith supplying said second polymerizable mixture to said second mold assembly, flowing said second polymerizable mixture over said first resin within said second mold cavity while selectively heating at least one of said mold sections of said second mold assembly in a preselected heating profile, monitoring said flowing of said first and second polymerizable mixtures within said second and third mold cavities, said heating of said mold sections of said second and third mold cavitys and formation of first and second resins therefrom, continuing said supplying of said first and second polymerizable mixtures to succeeding mold assemblies and the flowing of the mixtures into the respective mold cavities while selectively heating said mold sections until all of the mold assemblies have received said mixtures, monitoring said flowing of said mixtures, said heating of said mold sections and formation of resins therefrom, continuing said rotation of said mold assemblies throughout said steps of said continuous molding operation while monitoring individually each axis rotation of said mold assemblies, and coordinating said monitored flowing of each mixture, said monitored mold section heating and said monitored formation of each resin with each monitored axis rotation in a preselected profile to form said integrally molded structures of said first and second resins, separating said mold sections of each mold assembly after said integrally molded structure therein has achieved structural integrity within said mold cavity, removing said integrally molded structure from said separated mold sections and repeating said steps to form a multiplicity of said integrally molded structures of said first and second resins on a continuing basis.

2. A method of continuously forming integrally molded structures according to the method of claim 1 including the step of cooling said mold sections to separate them from said integrally molded structure.

3. A method of continuously forming integrally molded structures according to the method of claim 1 including the steps of flowing at least one of said polymerizable mixtures into a mold cavity, rotating said mold cavity to coat a first portion thereof, heating the coated mold section to set said first portion, continuing the rotation of the mold cavity to coat an adjacent second portion thereof, heating the adjacent coated second portion to set it and continuing the rotation of said mold cavity to coat the remaining portions sequentially and heating each succeeding portion until the entire mold cavity is coated and set, and thereafter cooling all of the mold sections to separate them from a resulting integrally molded structure.

4. A method of continuously forming integrally molded structures according to claim 1 including the steps of transferring said mold assembly to an adjacent mold receiving station prior to separating said mold sections and removing said structure from said separated mold sections and thereafter returning said mold assembly to a molding position for repeating the above steps.

5. A method of continuously forming integrally molded structures according to the method of claim 1 including the step of providing a plurality of mold assemblies for each molding position so that molding can be continued while other mold assemblies are being opened and prepared for repeating the above steps.

6. A method of continuously forming integrally molded structures according to the method of claim 1 including the step of introducing solid particles into said first mold cavity and distributing said particles into a preselected configuration before supplying said first polymerizable mixture to said first mold assembly.

7. A method of continuously forming integrally molded structures according to the method of claim 1 including the step of introducing micro spheres into at least one of said polymerizable mixtures.

8. Multiaxis rotational molding apparatus including a support portion, a molding portion and a control portion; said support portion including an upstanding frame section, a plurality of spaced arm members each having one end extending from said upstanding frame section; said molding portion including a plurality of mold supporting assemblies with one supporting assembly rotatably mounted adjacent a free end of each of said arm members, each of said mold supporting assemblies including an independently rotatable mold connector section, a plurality of mold assemblies each including a plurality of separable mold sections forming a substantially enclosed cavity, said mold sections including heating elements, connecting means selectively securing mold sections of one mold assembly together and to said mold connector section; said control portion including means disposed on said frame section sequentially aligning material dispensing means and each mold cavity, actuating means rotating each mold connector section and said mold assembly selectively affixed thereto and actuating means pivoting each mold supporting assembly and said mold assembly affixed thereto with respect to said arm member, programmable memory means storing preselected operating parameters, monitoring means sensing operating information from control components, circuitry transmitting signals from said monitoring means to coordinating means comparing said operating information with said operating parameters stored in said memory means and activating said orienting means and said actuating means to control rotation of said mold assembly in a preselected rotational profile, energizing of said heating elements of said mold sections in a preselected heating profile and formation of molded structures with said molding apparatus continuously in a preselected multiaxis molding profile.

9. Multiaxis rotational molding apparatus according to claim 8 wherein said heating elements include thermoelectric elements.

10. Multiaxis rotational molding apparatus according to claim 9 wherein said thermoelectric elements function in an operating temperature range providing heating and cooling.

11. Multiaxis rotational molding apparatus according to claim 8 wherein said rotatable mold connector section includes opposed spaced support sections.

12. Multiaxis rotational molding apparatus according to claim 8 wherein an arcuate guide member is associated with said frame section.

13. Multiaxis rotational molding apparatus according to claim 12 wherein one of said support sections includes drive means selectively engageable with said arcuate guide member.

14. Multiaxis rotational molding apparatus according to claim 8 including material dispensing means and aligning means providing relative movement between said dispensing means and said mold assemblies.

15. Multiaxis rotational molding apparatus according to claim 8 wherein said control portion includes actuating means separating and assembling said mold sections.

16. Multiaxis rotational molding apparatus according to claim 8 including mold assembly receiving stations adjacent said free ends of said arm members.

17. Multiaxis rotational molding apparatus according to claim 16 including means for transferring a mold assembly between said mold supporting assembly and an adjacent mold receiving station.

18. Multiaxis rotational molding apparatus according to claim 8 wherein said support portion includes a plurality of drive wheel assemblies arranged in a preselected configuration and selectively movable from a base surface in a preselected drive profile.

19. Multiaxis rotational molding apparatus according to claim 18 wherein said drive wheel assemblies are activated in coordination with adjacent drive wheel assemblies to provide rotation and movement of said mold assemblies in a preselected molding profile to form integrally molded structures continuously and automatically.

20. Multiaxis rotational molding apparatus according to claim 18 wherein said mold assemblies include peripheral paths engageable with drive wheel assemblies extending outwardly from said base surface to rotate said mold assemblies sequentially in a preselected rotational profile coordinated with the introduction of polymerizable mixtures into said mold cavities and the heating of mold sections in a preselected heating profile to continuously and automatically form integrally molded structures.

* * * * *